United States Patent [19]

Takahashi et al.

[11] Patent Number: 4,975,064
[45] Date of Patent: Dec. 4, 1990

[54] CLOCK SPRING INTERCONNECTOR FOR STEERING

[75] Inventors: Masaki Takahashi, Furukawa; Yuichi Ida, Miyagi, both of Japan

[73] Assignee: Alps Electric Co., Ltd., Tokyo, Japan

[21] Appl. No.: 426,333

[22] Filed: Oct. 24, 1989

[30] Foreign Application Priority Data

Dec. 21, 1988 [JP] Japan ............................ 63-164428[U]

[51] Int. Cl.⁵ .............................................. H01R 35/04
[52] U.S. Cl. ........................................ 439/15; 439/164
[58] Field of Search ................................... 439/15, 164

[56] References Cited

U.S. PATENT DOCUMENTS

| | | | |
|---|---|---|---|
| 4,607,898 | 8/1986 | Reighard et al. | 439/217 |
| 4,722,690 | 2/1988 | Priede | 439/15 |
| 4,744,763 | 5/1988 | Suzuki et al. | 439/15 |
| 4,797,109 | 1/1989 | Wende | 439/15 |
| 4,919,620 | 4/1990 | Yamaguchi et al. | 439/15 |

Primary Examiner—Gary F. Paumen
Attorney, Agent, or Firm—Guy W. Shoup; David W. Heid

[57] ABSTRACT

A clock spring interconnector for electrically connecting a fixed member and a movable member by use of a flexible cable. The clock spring interconnector provides a connector piece at the center of the interconnector which accommodates an eccentric motion between a rotating steering shaft and the fixed periphery of the interconnector by engaging a projection with a recess on pieces mounted to the stationary periphery and to the steering shaft respectively, while transmitting the rotational movement of the steering shaft to the movable piece of the interconnector and while keeping the gap between adjacent rotating pieces small.

3 Claims, 2 Drawing Sheets

CLOCK SPRING INTERCONNECTOR FOR STEERING

BACKGROUND OF THE INVENTION

1. Field of the Invention

The present invention relates to a clock spring interconnector which electrically connects a fixed member and a movable member rotated with respect to said fixed member by use of a flexible cable such as a flat cable, and more particularly, to a clock spring interconnector suitable for use with a steering system of a vehicle.

2. Description of the Prior Art

In a clock spring interconnector, one end of a flexible cable such as a flat cable is secured to a fixed member whereas the other end thereof is secured to a movable member so that when the movable member is rotated, the flexible cable is wound or unwound on the movable member side whereby the movable member can be rotated a predetermined amount. Such a clock spring interconnector is incorporated into a steering system of a vehicle and used as an electric connecting mechanism between a rotor side and a stator side of an air bag system, for example. In this case, the fixed member is secured to a steering column, and a steering shaft is inserted into and secured to the movable member. When a steering wheel is rotated clockwise or counter-clockwise, the turning force thereof is transmitted to the movable member through the steering shaft. When the clock spring interconnector is incorporated into the steering system as mentioned above, the center of rotation of the movable member on the clock spring interconnector side does not always coincide with the center of rotation of the steering shaft on the steering system side, but rather tends to deviate (providing some eccentricity) due to the working accuracy or error in assembly of steering system parts.

In a conventional cable reel, a gap is provided between the movable member and the fixed member so that the movable member can be moved in a radial direction with respect to the center of the fixed member, and the aforesaid eccentricity is absorbed by play in the gap. However, this poses a problem in that the diametral dimension of the movable member increases and the winding diameter of the flexible cable increases accordingly, thus reducing the limited rotational travel of the movable member. Furthermore, when the steering shaft is rotated, an undesired abutment between the movable member and the fixed member repeatedly occurs due to the aforesaid play, which leads to occurrence of abnormal noise during running of the vehicle.

SUMMARY OF THE INVENTION

It is therefore an object of the present invention to overcome the aforesaid problem noted above with respect to the prior art and provide a clock spring interconnector which can avoid reducing the limited rotational travel and absorb the eccentricity between pieces without the occurrence of abnormal noise.

To achieve the aforesaid object, the present invention provides a clock spring interconnector comprising a fixed member, a movable member mounted rotatably with respect to said fixed member, and a flexible cable having a number of turns between the fixed member and the movable member. The fixed member and the movable member are electrically connected by the flexible cable.

The clock spring interconnector comprises a connector member disposed at a center of the movable member. The connector member is movable in a radial direction with respect to the center of the movable member. When a steering shaft is inserted into the connector member and a turning force is applied, that turning force from the steering shaft is transmitted to said movable member through said connector member.

When the turning force of the steering shaft is transmitted to the movable member through the radially movable connector member, the eccentricity between the steering shaft and the clock spring interconnector, as the shaft is rotated, can be absorbed by the radial movement of the connector member even if the movable member is mounted to fixed member without radial play.

DESCRIPTION OF THE PREFERRED EMBODIMENTS

Figure 1:
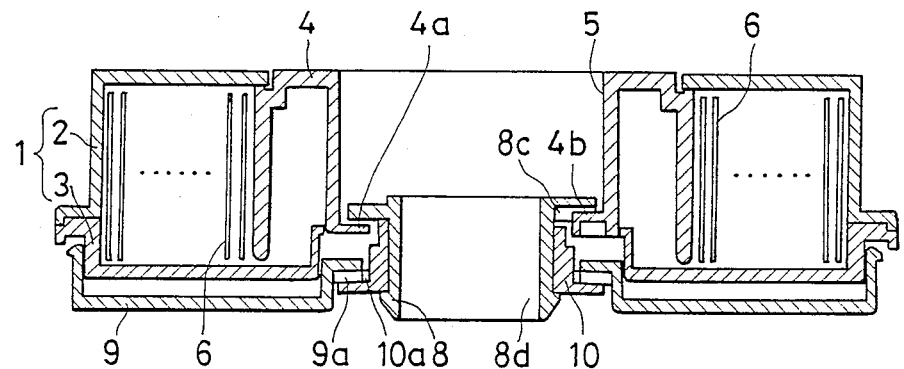
FIG. 1 is a longitudinal sectional view of a clock spring interconnector.
Figure 2:
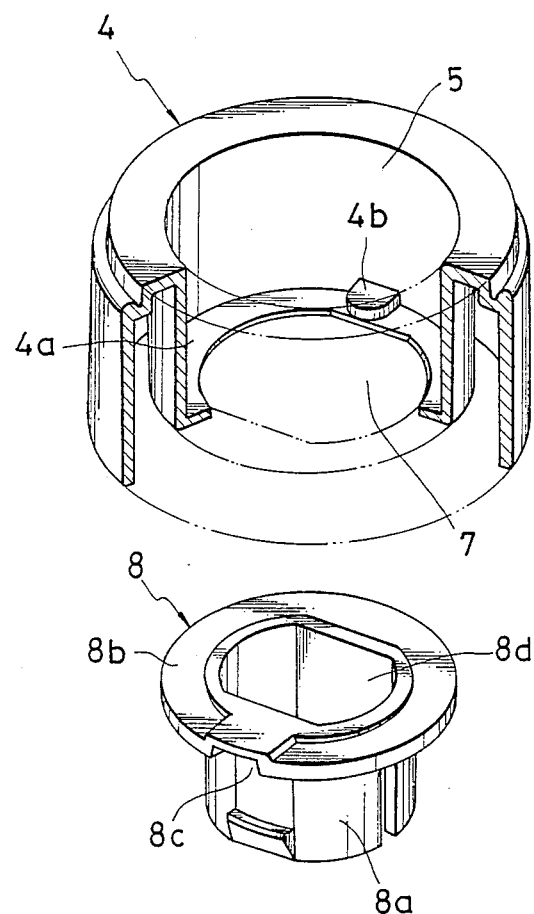
FIG. 2 is a perspective view of a movable member and a connector member.

Referring to FIG. 1, there is shown a fixed member 1 having a receiving space therein. The fixed member 1 is composed of an outer tube 2 and a cover 3 integrally connected to each other. A movable member 4 having a center hole 5 is rotatably fitted in the central portion of the fixed member 1. A flat cable 6 is wound in several turns in a space defined between the fixed member 1 and the movable member 4. The flat cable 6 is a known cable in which a plurality of conductors are laminated by flexible films, one end of the cable is sharply turned in the vicinity of a peripheral wall of the fixed member 1, after which it is led out of the fixed member 1, whereas the other end of the cable is sharply turned in the vicinity of a peripheral wall of the movable member 4, after which it is led out of the movable member 4. As will be apparent from FIG. 2, a collar 4a having a through-hole 7 is connected at one end of the center hole 5 of the movable member 4, and a connector member 8 is arranged within the through-hole 7 (a part of the movable member 4 is shown in cross-section for the sake of explanation).

The connector member 8 comprises a tubular portion 8a having an axial insert hole 8d in the center thereof and a ring-like portion 8b extending radially outward from one end of the tubular portion 8a. The tubular portion 8a has a diametral dimension which is smaller than the through-hole 7, and the ring-like portion 8b has a diametral dimension which is smaller than the center hole 5. Accordingly, the movable member 4 and the connector member 8 can be moved relative to one another in a radial direction a distance corresponding to a clearance formed between these pieces due to their differential sizing. The collar 4a is provided with a convex projection 4b, and the ring-like portion 8b is partly provided with a concave recess 8c so that when the convex projection 4b is positioned within the concave recess 8c, the movable member 4 and the connector member 8 are not relatively moveable in a circumferential direction, that is, they are rotated integrally. Turning back to FIG. 1, a stopper member 9 cannot be moved in a circumferential direction (a rotational direction) with respect to the cover 3 but can be moved in an axial direction (the vertical direction in FIG. 1). The stopper 9 is biased by a spring means, such as a spring for example (not shown), in a direction away from the cover 3. An engaging portion 9a is provided at the inner peripheral edge of the stopper 9. Along this inner edge concave recesses and convex projections are provided alternating one with the other continuously around the edge in a circumferential direction. A locking member 10 is fitted in and secured to the tubular portion 8a of the connector member 8. An engaging portion 10a is provided at an outer peripheral edge of the locking member 10. Along this outer edge concave recesses and convex projections are provided alternating one with the other continuously around the edge in a circumferential direction. The engaging portions (projections and recesses) 9a and 10a of the stopper member 9 and the locking member 10, respectively, when engaged thereby prevent rotation of the fixed member 1 relative to the movable member 4.

The clock spring interconnector according to the present invention has been structured as outlined above. The operation of the clock spring interconnector will be described hereinafter.

Figure 3:
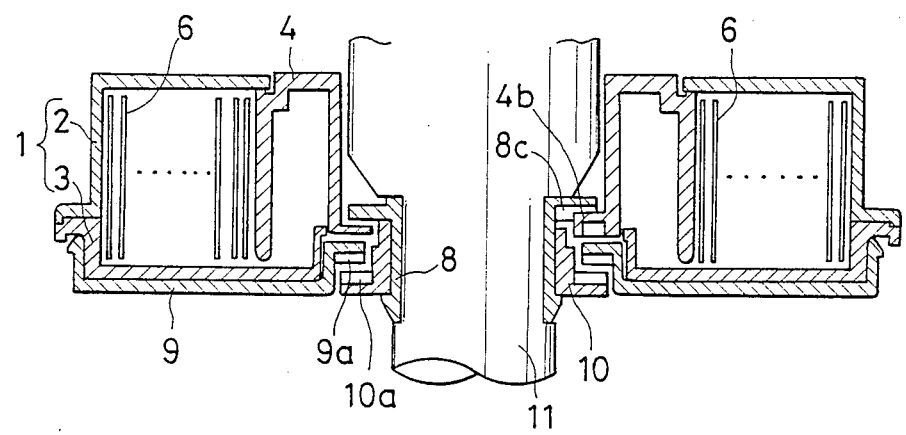
FIG. 3 is a longitudinal sectional view showing the clock spring interconnector incorporated into a steering system.

First, the fixed member 1, the movable member 4, and the flat cable 6 are assembled as shown in FIG. 1. In this Figure, the convex projection 4b of the movable member 4 is shown positioned within the concave recess 8c of the connector member 8 and the engaging portions 9a and 10a of the stopper member 9 and the locking member 10, respectively, are shown in their engaged positions, and therefore, the rotation of the movable member 4 is prevented. After the aforesaid assembly has been completed and for final assembly, when the stopper member 9 is pressed and moved toward the cover 3 against the spring means, the engaging portion 9a of the stopper member 9 is moved away from the engaging portion 10a of the locking member 10, and the movable member 4 is rendered free to rotate (as shown in FIG. 3 with the shaft 11). In this step, the movable member 4 is then rotated until it is arranged in a neutral position by means of a positioning mechanism (not shown), after which the force pressing the stopper member 9 is removed. The movable member 4 is once again maintained in a locked state shown in FIG. 1 by the engagement between both engaging portions 9a and 10a. Accordingly, during the transportation of the assembled clock spring interconnector, indiscriminate rotation of the movable member 4 with respect to the fixed member 1 is eliminated, and the clock spring interconnector can be incorporated into the steering system as it is.

When incorporating the thus assembled clock spring interconnector into the steering system, as shown in FIG. 3, the steering shaft 11 which is a member on the medial side of the steering system is inserted into and secured to the axial insert hole 8d of the connector member 8, the fixed member 1 is secured to a steering column (not shown) which is a member on the lateral side of the steering system, and the stopper member 9 is pressed and moved toward the cover 3 against the spring means (not shown) by the steering column whereby both engaging portions 9a and 10a are moved apart as mentioned above to automatically release the locked state of the movable member 4. At the time of such incorporation, the center of the steering shaft 11 is not always coincident with the center of the clock spring interconnector, such that when one is rotated it moves in an eccentric path about the other. However in this invention, this eccentricity is absorbed by movement of the connector member 8 in a radial direction. After the clock spring interconnector has been incorporated into the steering system and when the steering shaft 11 is rotated in a first direction by a steering wheel (not shown), the flat cable 6 is wound close to the peripheral wall of the movable member 4, and conversely, when the steering shaft 11 is rotated in a second direction, the flat cable 6 is unwound from the peripheral wall of the moveable member 4. In either case, the electric connection between the fixed member 1 and the movable member 4 is maintained through the flat cable 6. As described above, in the above-described embodiment, since the eccentricity between the steering shaft 11 and the clock spring interconnector is absorbed by the connector member 8, it is not necessary to provide a gap between the fixed member 1 and the movable member 4 to allow for this eccentric motion and the movable member 4 can be mounted to the fixed member 1 in a close contact state. Therefore, the outside diametral dimension of the movable member 4 does not indiscriminately become large, and the limited rotational range of the movable member 4 can be secured in the space enclosed by the movable member. Abutment of the fixed member 1 to the movable member during rotation can be prevented to suppress occurrence of abnormal noise.

As described above, according to the present invention, the rotation of the steering shaft is transmitted to the movable member through the radially movable connector member 8. Therefore, even if the movable member 4 is mounted to the fixed member 1 in a closely fitted configuration, the eccentricity between the steering shaft 11 and the clock spring interconnector can be absorbed. Accordingly, it is possible to provide a clock spring interconnector which which does not reduce the rotational range of a movable member and without the occurrence of abnormal noise from the hitting of abutting pieces.

We claim:

1. A clock spring interconnector comprising:
    a fixed member;
    a movable member, mounted with respect to said fixed member, for rotation about the movable member's center of rotation;
    a flexible cable, having more than one turn, positioned between said fixed member and said movable member, said fixed member and said movable member being electrically connected by said flexible cable; and
    a connector member disposed at the center of said movable member and operatively coupled to said movable member such that said connector member is slidably coupled with said movable member in a radial direction thereby permitting said connector member to rotate about a center of rotation which is different than said center of rotation of said movable member and said connector member is rotatably coupled to said movable member in a circumferential direction, so that a misalignment between said connector member center of rotation and said center of rotation of said movable member may occur without displacing said center of rotation of said movable member; and whereby when a steering shaft is inserted into said connector member, a turning force of the steering shaft is transmitted to said movable member through said connector member.

2. A clock spring interconnector according to claim 1, further comprising structures as follows,
wherein said movable member comprises:
   a collar having a through-hole disposed therein, said collar projecting radially toward a center of said movable member at one end of a center hole disposed in said movable member into which a steering shaft is inserted,
wherein said connector member comprises:
   a tubular portion having a steering shaft inserting hole in the center thereof and
   a ring-like portion extending radially outward from one end of said tubular portion, said tubular portion having an outside diameter dimension set to be smaller than an inside diameter dimension of said through-hole,
wherein said ring-like portion has an outside diameter dimension set to be smaller than an inside diameter dimension of said center hole, wherein said connector member is capable of being moved in the radial direction relative to said movable member.

3. A clock spring interconnector according to claim 1 or 2, wherein said collar of said movable member is provided with a convex projection, and said ring-like portion is provided with a concave recess so that when the convex projection is positioned within the concave recess, said movable member and said connector member are operatively connected for integral rotation.

* * * * *